United States Patent
Gallivan (10) Patent No.: US 8,188,905 B2
(45) Date of Patent: May 29, 2012

(54) TARGET TRACKING SYSTEM AND METHOD WITH JITTER REDUCTION SUITABLE FOR DIRECTED ENERGY SYSTEMS

(75) Inventor: James R. Gallivan, Pomona, CA (US)

(73) Assignee: Raytheon Company, Waltham, MA (US)

( * ) Notice: Subject to any disclaimer, the term of this patent is extended or adjusted under 35 U.S.C. 154(b) by 426 days.

(21) Appl. No.: 12/474,483

(22) Filed: May 29, 2009

(65) Prior Publication Data

US 2012/0104282 A1    May 3, 2012

Related U.S. Application Data

(60) Provisional application No. 61/056,905, filed on May 29, 2008.

(51) Int. Cl.
- *G01S 13/66* (2006.01)
- *G01S 13/86* (2006.01)
- *G01S 13/00* (2006.01)

(52) U.S. Cl. .......... 342/13; 315/32; 315/39.51; 89/1.11; 342/52; 342/53; 342/54; 342/61; 342/67; 342/73; 342/74; 342/82

(58) Field of Classification Search .............. 342/52–56, 342/61–67, 73–82, 175, 195, 13–16, 27, 342/28, 165, 173, 174, 350, 359; 89/1.11; 382/100, 103; 315/32, 39.51; 250/200, 201.1, 250/201.9; 244/34 R, 35 R, 198, 201, 204, 244/205; 356/4.01

See application file for complete search history.

(56) References Cited

U.S. PATENT DOCUMENTS

| | | | |
|---|---|---|---|
| 3,952,304 A | 4/1976 | Broniwitz et al. | |
| 6,839,662 B2 | 1/2005 | Schnatterly et al. | |
| 7,126,530 B2 * | 10/2006 | Brown | 342/359 |
| 7,164,234 B2 * | 1/2007 | Achenbach et al. | 315/39.51 |
| 7,504,982 B2 * | 3/2009 | Berg et al. | 342/13 |
| 7,626,152 B2 * | 12/2009 | King et al. | 250/201.9 |
| 7,629,918 B2 * | 12/2009 | Brown et al. | 342/13 |
| 7,641,153 B2 * | 1/2010 | Smereczniak | 244/205 |
| 7,961,133 B2 * | 6/2011 | Vollin et al. | 342/67 |
| 7,978,313 B2 * | 7/2011 | Guthrie | 356/4.01 |
| 2005/0187677 A1 | 8/2005 | Walker | |

FOREIGN PATENT DOCUMENTS

FR    2881532 A1 *    8/2006

OTHER PUBLICATIONS

"International Application Serial No. PCT/US09/03278, Search Report mailed Jul. 14, 2009", 2 pgs.

"International Application Serial No. PCT/US09/03278, Written Opinion mailed Jul. 14, 2009", 10 pgs.

* cited by examiner

*Primary Examiner* — Bernarr Gregory (74) *Attorney, Agent, or Firm* — Schwegman, Lundberg & Woessner, P.A.; Gregory J. Gorrie (57) ABSTRACT

Embodiments of a target tracking system and method with jitter reduction suitable for directed energy systems are generally described herein. In some embodiments, the directed energy system includes a target tracking system to track one or more track points on a moving target, and a beam transmission unit to maintain a directed energy beam on a selected one of the track points in response to tracking control signals provided by the target tracking system. The track points may be smaller than a spot size of the directed energy beam maintained on the target.

24 Claims, 5 Drawing Sheets

TARGET TRACKING SYSTEM AND METHOD WITH JITTER REDUCTION SUITABLE FOR DIRECTED ENERGY SYSTEMS

This application claims the benefit of U.S. Provisional Application No. 61/056,905, filed May 29, 2008 entitled APPARATUS AND METHODS FOR TRACKING SYSTEM FOR DIRECTED ENERGY WEAPONS.

TECHNICAL FIELD

Embodiments pertain to target tracking systems. Some embodiments pertain to directed energy systems (DES). Some embodiments pertain to active denial systems (ADS).

BACKGROUND

Some directed energy systems use a high power energy beam to counter threats instead of the chemical and kinetic energy used by more conventional weapons. Some directed energy systems, referred to as active denial systems, repel aggressors with a high-power energy beam, avoiding deadly force and causing collateral damage. One issue with these directed energy systems is accurately aiming the high-power energy beam on a particular target area long enough to cause a deterring effect. The larger the area on the target area that is radiated, the more energy that is needed to cause a deterring effect. Achieving a deterring effect is particularly difficult with a moving target because the target's movement and jitter effectively spreads the high-power energy beam over a larger target area, significantly increasing the amount of energy and/or time needed to cause a deterring effect.

Thus, there are general needs for target tracking systems that allow directed energy systems to reduce the amount of energy and/or time needed to cause a deterring effect on a moving target. There are also general needs for tracking systems for use with directed energy systems that can reduce and/or remove the effects of target movement and jitter. There are also general needs for directed energy systems that can use lower energy levels, which allow for the use of cost-effective solid-state amplifier components.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Embodiments set forth in the claims encompass all available equivalents of those claims.

Figure 1:
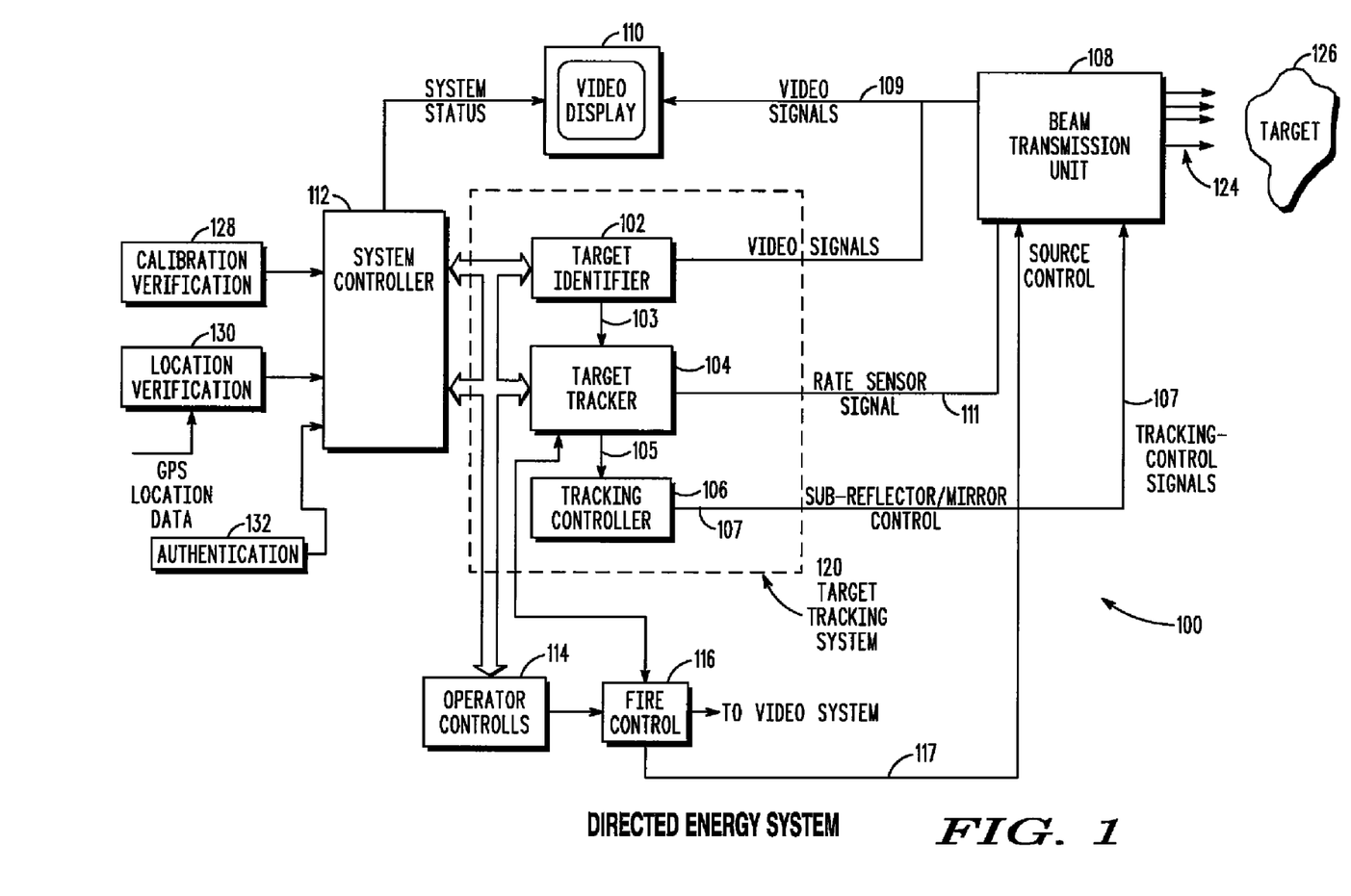
FIG. 1 is a functional diagram of a directed energy system, including a target tracking system, in accordance with some embodiments.

FIG. 1 is a functional diagram of a directed energy system, including a target tracking system, in accordance with some embodiments. Directed energy system 100 includes, among other things, a target tracking system 120 and a beam transmission unit 108. The target tracking system 120 may be configured to track a target 126, including one or more track points on the target 126. The beam transmission unit 108 may be configured to maintain a directed energy beam 124 on a selected track point in response to tracking control signals 107 provided by the target tracking system 120. In these embodiments, the track points may be smaller than a spot size of the directed energy beam 124 that is maintained on the target 126 when the beam transmission unit 108 is transmitting.

Figure 2:
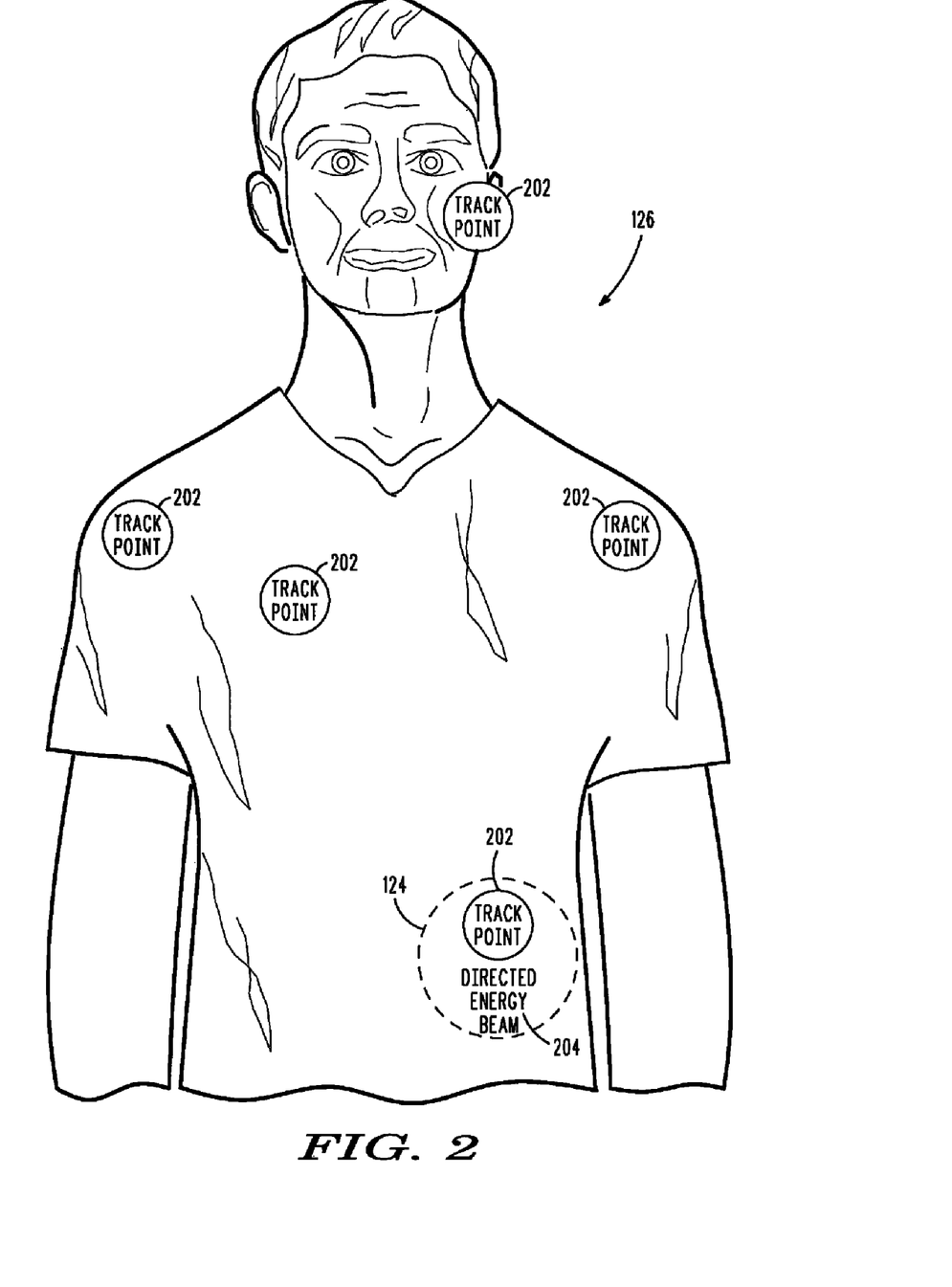
FIG. 2 illustrates track points on an example target in accordance with some embodiments.

FIG. 2 is illustrates track points on an example target in accordance with some embodiments. As illustrated in FIG. 2, one or more track points 202 on target 126 may be tracked by target tracking system 120 (FIG. 1). The track points 202 may be configured to be smaller than a spot size 204 of the directed energy beam 124. Although FIG. 2 illustrates a human target, embodiments are equally suitable to almost any type of target.

Referring to FIGS. 1 and 2 together, the target tracking system 120 may include a target identifier 102, a target tracker 104, and a tracking controller 106. The target identifier 102 may receive video signals 109 and may be configured to identify the target 126 from the background. The target identifier 102 may also be configured to identify one or more track points 202 on the target 126. In some embodiments, the target identifier 102 may be configured to separate target pixels from background pixels. The target identifier 102 may be configured to identify predetermined types of targets, such as human targets.

The target tracker 104 may track one or more of the track points 202 based on outputs 103 of the target identifier 102 and a rate-sensor signal 111. The tracking controller 106 may generate the tracking control signals 107 based on outputs 105 of the target tracker 104 to control the beam transmission unit 108 for placement of a directed energy beam 124 on one of the track points 202. The target tracking system 120 may use rate sensors in the beam transmission unit 108 combined with optical tracking based on the video signals 109 to track at least one track point 202 as part of a tracking control loop in order to maintain the directed energy beam 124 on a selected one of the track points 202 for an amount of time to cause a deterring effect on the target 126.

By optically tracking track points 202 on the target 126 and using a rate of motion of the beam transmission unit 108, the target tracking system 120 can reduce and/or remove the effects of target movement and jitter. Thus, the amount of energy and/or time needed to cause a deterring effect on a moving target may be reduced, allowing for the use of more cost-effective solid-state components. Each of the one or more track points 202 may be a fraction of the spot size 204 of the directed energy beam 124 (e.g., less than half the diameter of the spot size 204). Since the diameter of a track point 202 is smaller (in some embodiments, much smaller) than the diameter of the spot size 204, tracking based on track points 202 is more accurate than the spot size 204. Tracking more accurately that the spot size 204, among other things, compensates at least in part for jitter and movement of the target 126. This allows less radio-frequency (RF) power to produce a desired effect (i.e., raise skin temperature) and deter the target 126. Lower RF power levels, for example, allow lower-cost amplifiers to be used. The track points 202 may be approximately half an inch or less in diameter and the spot size 204 may be approximately one inch or less in diameter, although the scope of the embodiments is not limited in this respect.

In some embodiments, the minimum size of the directed energy beam 124 may be approximately four inches. In some embodiments, the energy distribution of the directed energy beam 124 may have a Gaussian profile with a higher energy distribution toward the center of the spot size 204. In these embodiments, the size of track points 202 may be selected so that the directed energy beam 124 can be maintained within a quarter of the beamwidth. For example, for a four-inch spot size, tracking points may be approximately three inches. In this way, tracking need not be more accurate than a quarter of the beamwidth, allowing for lower system power requirements, increased range capability, and reduced energy exposure to other parts of the target.

In some embodiments, discussed in more detail below, the target tracker 104 is configured to track two or more track points 202. The tracking of two or more track points 202 that are smaller than the beam size is particularly advantageous to moving targets.

Directed energy system 100 may also include a fire control element 116 configured to control an amount of time that the directed energy beam 124 is positioned on a selected one of the track points 202. The amount of time may be calculated to provide a minimum surface temperature rise based on a distance to the target 126 and the spot size 204 on the target 126. In these embodiments, the fire control element 116 may determine a sufficient amount of time for the energy of beam 124 to be integrated and converted to a rise in skin temperature to deter the target 126. This is unlike some conventional directed energy systems that cover larger areas of a target to minimize tracking problems. These conventional systems require the generation of higher power levels to achieve a deterring effect on a target. As a result, these conventional systems are more costly and less effective with moving targets. In some embodiments, a millimeter-wave amplifier within beam transmission unit 108 may be configured to generate a high-power output signal in response to a source control signal 117 provided by fire control element 116.

The directed energy system 100 may also include a system controller 112 to control the various elements of directed energy system 100. In some embodiments, in response to a beam fire signal, the system controller 112 may cause the tracking controller 106 to focus and direct the directed energy beam 124 on a selected track point and may cause beam transmission unit 108 to maintain the directed energy beam 124 on the selected track point for the amount of time determined by the fire control element 116. The fire control element 116 may be configured to inhibit the directed energy beam 124 from being focused on the selected track point for greater periods of time to prevent a temperature rise above a predetermined maximum temperature.

In some embodiments, directed energy system 100 may include operator controls 114 to allow an operator to operate directed energy system 100. In some embodiments, the operator may identify a target 126 on a video display 110 and may select one of the track points 202, which may be highlighted on the video display 110. The operator controls 114 may also be configured to allow the operator to fire the directed energy beam 124 in conjunction with the operations of fire control element 116.

In some embodiments, the fire control element 116 may be configured to inhibit the directing of the directed energy beam 124 on predetermined portions of a human body (e.g., the face, eyes, or head) even though one or more of the track points 202 may be provided on these portions of the target 126. The target identifier 102 may be configured to recognize images to distinguish between human and non-human images. The target identifier 102 may also be configured to identify particular portions of the human body (e.g., the face, eyes, or head) using feature-recognition algorithms to prevent such portions from being fired upon by directed energy beam 124.

In some embodiments, the target identifier 102 may be configured to identify a predetermined type of target (e.g., a human) within the video signals 109. The operator may identify a target 126 displayed on the video display 110 and may select the target 126 for tracking (i.e., by using a mouse or other input device through operator controls 114). The operator may also select one or more track points 202 on the target 126 for tracking by the target tracker 104. In some embodiments, the operator may select a target 126 from several targets that may be displayed on the video display 110. This may allow the operator to identify a suspected intruder. In some embodiments, when the directed energy beam 124 is fired, the portion of the target 126 that is radiated by the directed energy beam 124 may be highlighted on the video display 110. In some embodiments, the system controller 112 may be configured to provide system status information for display on the video display 110.

In some embodiments, the target identifier 102 may implement algorithms to recognize and identify humans, and may implement facial recognition software to identify facial features and to identify particular persons using the facial recognition software. In these embodiments, the target identifier 102 may be coupled to a database to allow particular persons to be identified and targeted.

In some optional embodiments, directed energy system 100 may also include calibration verification circuitry 128 to inhibit the directed energy beam 124 from being fired when the directed energy system 100 is not in calibration. Directed energy system 100 may also include location verification circuitry 130 to inhibit the directed energy system 100 from being operated when it is not in an approved or authorized location. The location verification circuitry 130 may use GPS location data and may include a GPS receiver. In these optional embodiments, directed energy system 100 may also include authentication circuitry 132 to inhibit the directed energy beam 124 from being fired by unauthorized operators. In these optional embodiments, system controller 112 may include decision logic to make the directed energy system 100 non-operational and/or non-functional depending on location verification, calibration verification, and user verification. In some of these embodiments, system controller 112 may include decision logic to verify that legal and operational guidelines are being followed and inhibit the operation of directed energy system 100 when legal and operational guidelines are not being followed.

In some embodiments, a method for operating a directed energy system, such as directed energy system 100, is provided. In these embodiments, operation of the directed energy system may be enabled when a calibration and a location are verified. Operation of the directed energy system may be disabled when the calibration or the location are not verified. Operation of the directed energy system may be disabled after a target exposure time is exceeded. Operation of the directed energy system may be enabled when a user is authenticated and may be disabled when the user is not able to be authenticated. In some embodiments, the method may include verifying operational rules of engagement based on the calibration and the location, and disabling operation of the directed energy system when the operational rules of engagement are not met. In some of these embodiments, the location may be verified based on GPS location information.

Although directed energy system 100 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of directed energy system 100 may refer to one or more processes operating on one or more processing elements.

Figure 3:
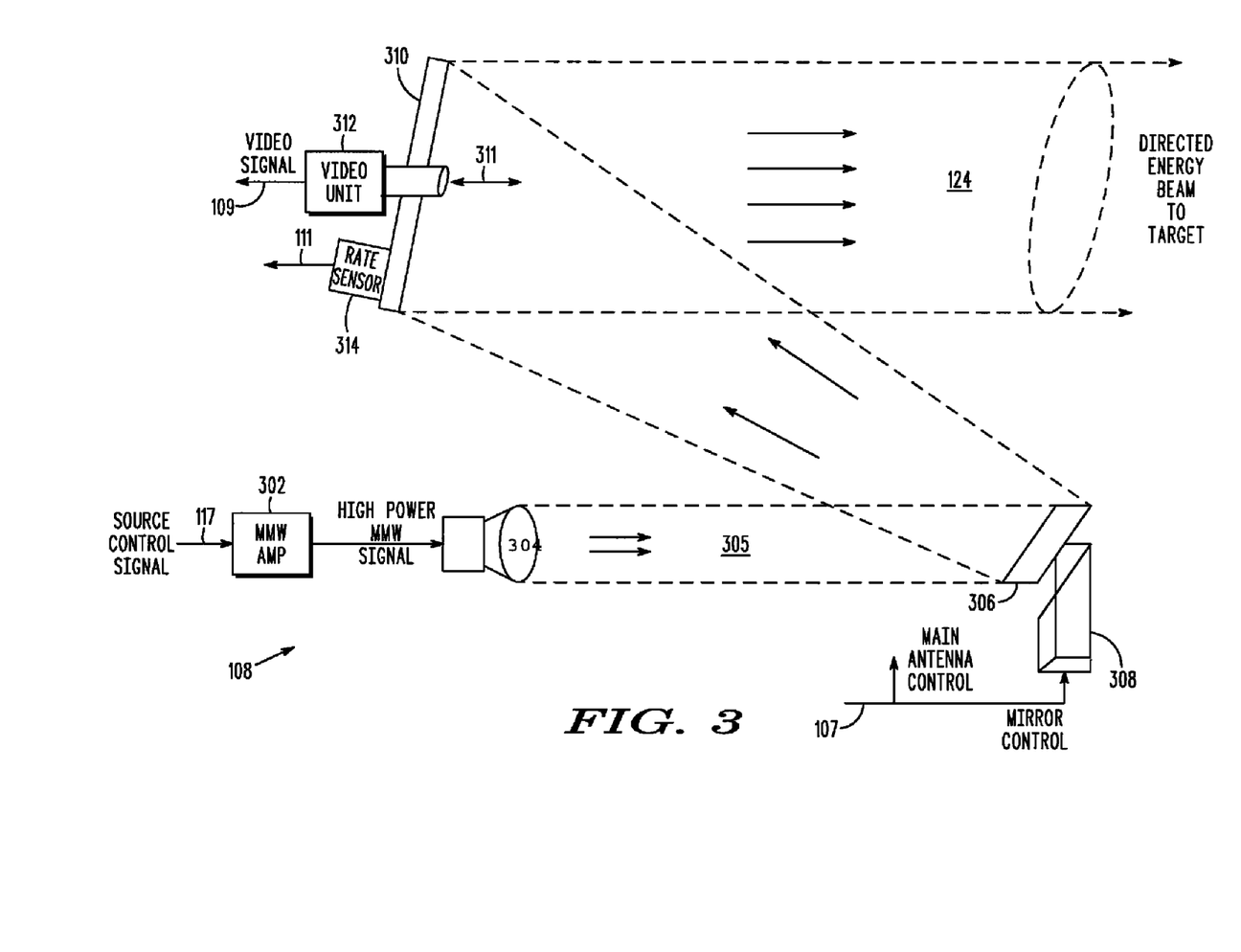
FIG. 3 is an illustrative diagram of a beam transmission unit in accordance with some embodiments.

FIG. 3 is an illustrative diagram of a beam transmission unit in accordance with some embodiments. The beam transmission unit 108 illustrated in FIG. 3 may be suitable for use as the beam transmission unit 108 illustrated in FIG. 1. Beam transmission unit 108 may include, among other things, a main antenna 310, a sub-reflector 306, and rate sensors 314. The video signals 109 may be generated by a video transmission unit 312 coupled to the main antenna 310 and directed to capture video in a transmission direction 311 of the main antenna 310. The tracking control signals 107 that are generated by the tracking controller 106 (FIG. 1) may be configured to control the transmission direction 311 of the main antenna 310 when tracking the target 126 (FIG. 1) to keep the target 126 in a field of view of the video transmission unit 312. The rate sensors 314 may be configured to sense a rate of motion of the beam transmission unit 108 to provide the rate-sensor signal 111 for use by the target tracker 104 in tracking the track points 202 on the target 126 as part of a tracking control loop. The rate-sensor signal 111 may be used by the target tracker 104 (FIG. 1) to correlate the rate-of-motion of the beam transmission unit 108 with motion of the target 126 and motion of the background within the video signals 109.

The tracking controller 106 may generate the tracking control signals 107 to control the sub-reflector 306 for placement and focus of the directed energy beam 124 on a selected one of the track points 202 (FIG. 2). The sub-reflector 306 may comprise a two-axis rotatable mirror whose position may be controlled by tracking control signals 107 to direct a high-power millimeter-wave signal 305 to a location on the main antenna 310 selected so that the directed energy beam 124 is placed on the selected track point 202. The position of the sub-reflector 306 may also be controlled to focus the directed energy beam 124 on the target 126 based on a distance to the target 126. In these embodiments, the directed energy beam 124 may be a converging beam although this is not a requirement. In some embodiments, the beam transmission unit 108 may include a laser range finder to determine the distance to the target 126.

In some embodiments, the main antenna 310 may be a parabolic surface antenna. In other embodiments, the main antenna 310 may be a flat parabolic surface (FLAPS) antenna having a geometrically flat surface with an array of elements to allow it to operate electromagnetically as a parabolic reflector to generate a focused beam on the target 126. In some embodiments, main antenna 310 may be configured to generate a directed energy beam 124 having a beam profile that limits the power density to portions of the target 126 outside the selected track point. In these embodiments, the beam profile may be selected for a particular distance and antenna size.

The beam transmission unit 108 may also include a millimeter-wave amplifier 302 and transmit (TX) antenna 304 to generate the high-power millimeter-wave signal 305. In some embodiments, the millimeter-wave amplifier 302 is a solid-state amplifier configured to generate a high-power millimeter-wave signal having a frequency between 94 and 96 GHz. Millimeter-wave amplifier 302 may be configured to generate a high-power output signal in response to source control signal 117, which may be provided by fire control element 116 (FIG. 1).

In some embodiments, the various elements of the beam transmission unit 108 may be mounted on a single platform and configured to move as a single unit. The single platform may be gimbaled to allow three-directional target tracking and placement of the directed energy beam 124.

Figure 4:
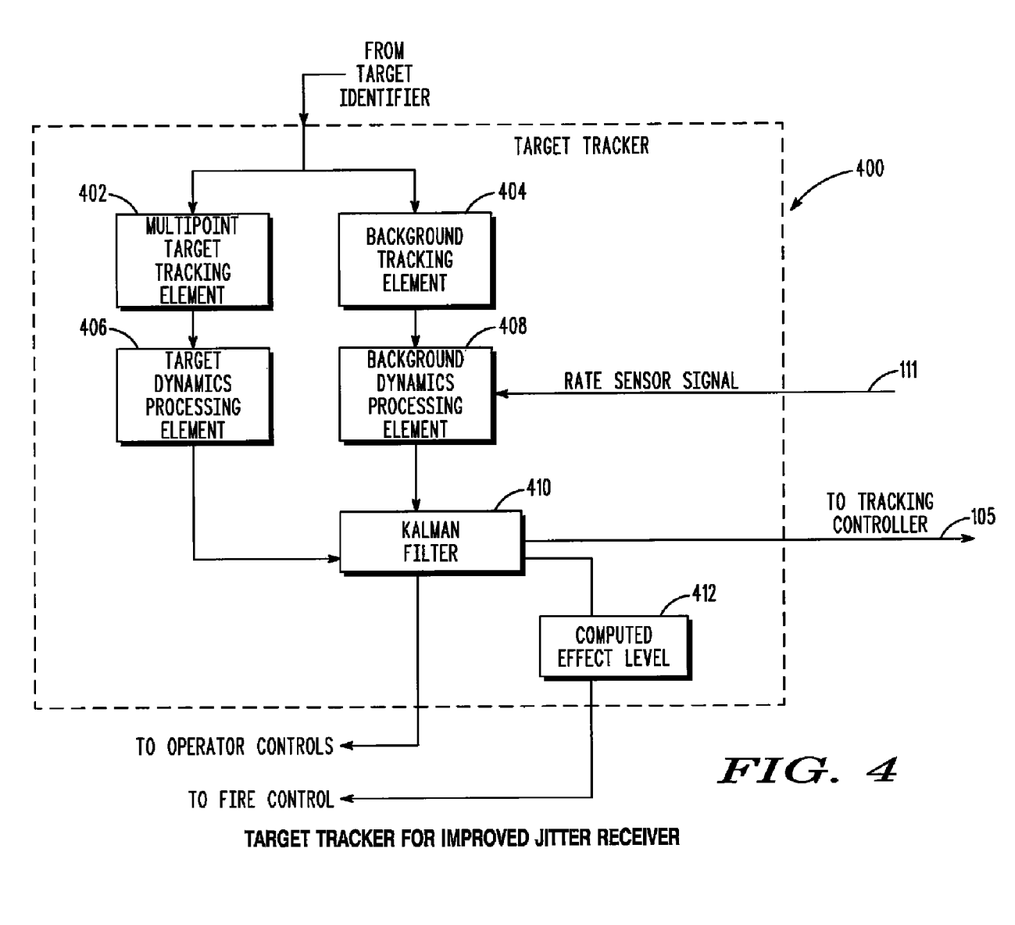
FIG. 4 is a functional block diagram of a target tracker in accordance with some embodiments.

FIG. 4 is a functional block diagram of a target tracker in accordance with some embodiments. In these embodiments, target tracker 400, illustrated in FIG. 4, may be suitable for use as the target tracker 104 (FIG. 1), although other target trackers may also be suitable. The target tracker 400 may include a target tracking element 402 to track the one or more track points 202 (FIG. 2) based on features of the target 126 (FIG. 1) identified by the target identifier 102 (FIG. 1). The target tracker 400 may also include a background tracking element 404 to track a background portion of a field-of-view of the video transmission unit 312 (FIG. 3). The target tracking element 402 may be responsive to changes in the background portion to identify a target portion of the field of view. For example, the target tracking element 402 may detect changes in background pixels to track the target 126 (FIG. 2). In some embodiments, the background tracking element 404 may execute a re-registration algorithm to distinguish the background from the target 126.

In some embodiments, the target tracking element 402 may be a multi-point target tracking element 402 configured to track two or more track points 202 on the target 126. In this way, some track points may be maintained as the target 126 moves, changes position, and turns around. Furthermore, tracking controller 106 (FIG. 1) may be configured to quickly switch between track points for placement of the directed energy beam 124.

In some embodiments, target tracker 400 may include a target dynamics processing element 406 to process target movement and compute a dynamic error signal for the target 126, and a background dynamics processing element 408 to process background movement and compute a dynamic error signal for the background. The target tracker 400 may also include a Kalman filter 410 responsive to dynamic error signals to generate the outputs for tracking controller 106 (FIG. 1). The target tracker 400 may also include a computed effect level processing element 412 to compute a time, a distance, and amount of target jitter for use by the fire control element 116 (FIG. 1). The fire control element 116 may be response to outputs of the computed effect level processing element 412. For example, the time that directed energy beam 124 is placed on a track point may be increased with increased amounts of target jitter to achieve a desired effect.

In some embodiments, the Kalman filter 410 may use the dynamic error signals from the target and background dynamics processing elements 406 and 408 not only to provide an estimate of the present location of the target 126, but to predict future positions of the target 126 to assist in target tracking. In some embodiments, these separate error signals may be processed separately for optimal target tracking. The target tracker 104 uses a tracking guidance loop error signal that is run to a beam-angle controller as part of tracking control signals 107 to optically maintain the directed energy beam 124 on a selected tracking point. The target tracker 104 may use higher order and predictive guidance tracking processes to allow for tight tracking even under acceleration conditions.

Figure 5:
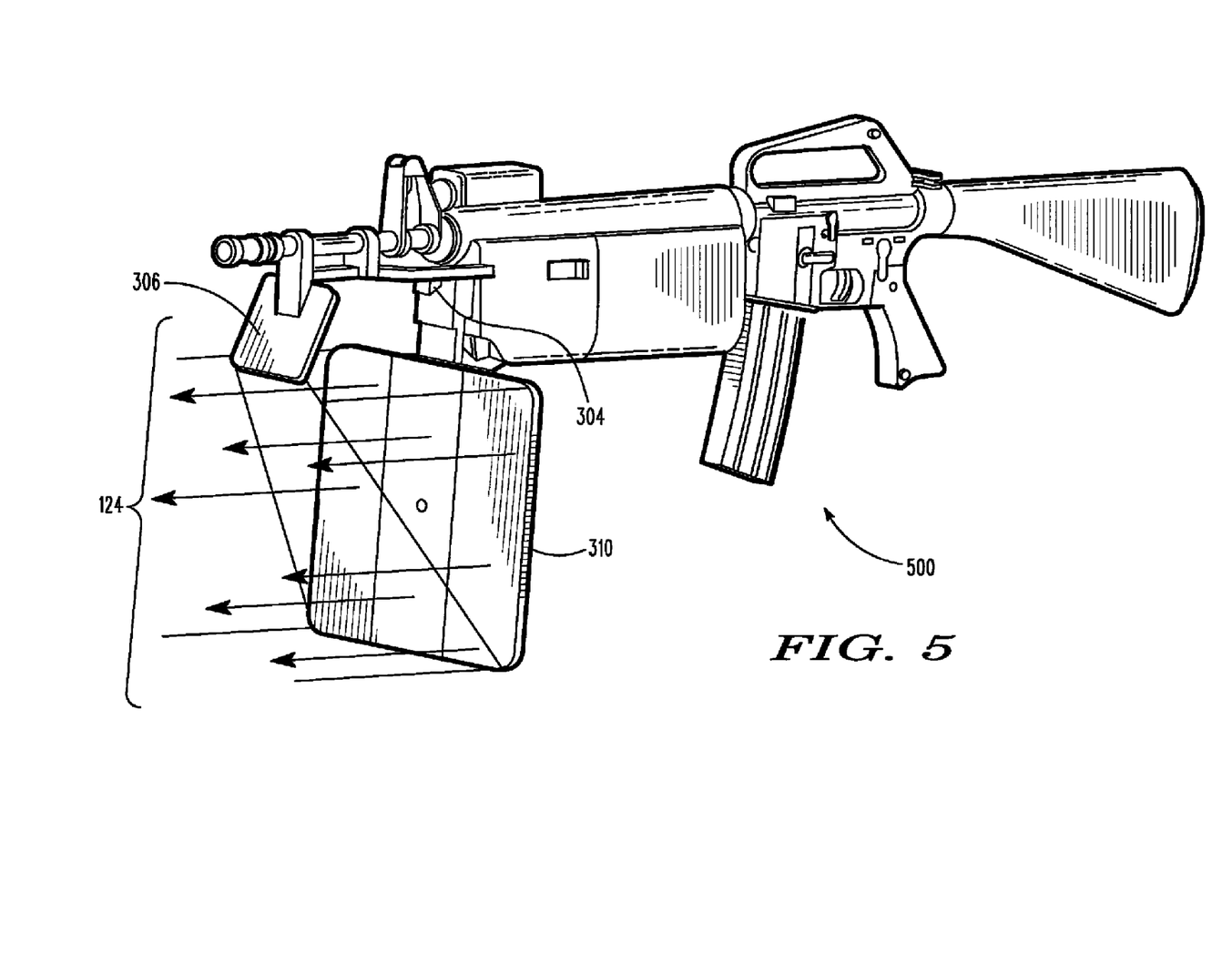
FIG. 5 illustrates an example hand-held directed energy system that includes a target tracking system in accordance with some embodiments.

FIG. 5 illustrates an example hand-held directed energy system that includes a target tracking system in accordance with some embodiments. Hand-held directed energy system 500 may include the functional elements of the directed energy system 100 (FIG. 1). The hand-held directed energy system 500 includes main antenna 310, sub-reflector 306 and transmit antenna 304 illustrated separately. The other functional components of the directed energy system 100 may be located internally. Hand-held directed energy system 500 may track one or more track points on a target based on outputs of a target identifier. Hand-held directed energy system 500 may also generate tracking control signals based on outputs of the target tracker to control a beam transmission unit for placement of a directed energy beam 124 on one of the track points. Accordingly, a target may be deterred without the use of lethal force.

The Abstract is provided to comply with 37 C.F.R. Section 1.72(b requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A target tracking system configured for use in a directed energy system, the target tracking system comprising:
    a target identifier to receive video signals and to separate a target from a background;
    a target tracker to track one or more track points on the target based on outputs of the target identifier; and
    a tracking controller to generate tracking control signals based on outputs of the target tracker to control a beam transmission unit for placement of a directed energy beam on a selected one of the track points,
    wherein the one or more track points are configured to be smaller than a spot size of the directed energy beam to allow the directed energy beam to cover the selected track point to compensate for target jitter and cause a desired effect within the selected track point.

2. The system of claim 1 wherein the beam transmission unit comprises one or more rate sensors configured to sense a rate-of-motion of the beam transmission unit and provide a rate-sensor signal for use by the target tracker to track the one or more track points on the target as part of a tracking control loop.

3. The system of claim 2 wherein the beam transmission unit comprises a main reflector antenna, a sub reflector, and rate sensors,
    wherein the video signals are generated by a video transmission unit coupled to the main reflector antenna and directed to capture video in a transmission direction of the main reflector antenna,
    wherein the tracking control signals are further configured to control the transmission direction of the main reflector antenna when tracking a target to keep the target in a field of view of the video transmission unit, and
    wherein the tracking controller is configured to generate the tracking control signals to control the sub reflector for placement and focus of the directed energy beam on a selected one of the track points.

4. The target tracking system of claim 3 further comprising a fire control element configured to control an amount of time the directed energy beam is positioned on the selected track point,
    wherein the amount of time is calculated to provide a surface temperature rise based on a distance to the target and the spot size on the target.

5. The target tracking system of claim 4 wherein the directed energy system further comprises a system controller,
    wherein in response to a beam fire signal, the system controller is configured to cause the tracking controller to focus and direct the directed energy beam on the selected track point, and to maintain the directed energy beam on the selected track point as the target moves for the amount of time determined by the fire control element, and
    wherein the fire control element is configured to inhibit the directed energy beam from being focused on the selected track point for greater periods of time to prevent a temperature rise above a predetermined maximum temperature.

6. The target tracking system of claim 5 wherein the fire control element is further configured to inhibit the directing of the directed energy beam on predetermined portions of a human body even though one or more track points may be provided on the predetermined portions.

7. The target tracking system of claim 1 wherein the target tracker comprises:
    a target tracking element to track the one or more track points based on features of the target identified by the target identifier; and
    a background tracking element to track a background portion of a field of view of a video transmission unit,
    wherein the target tracking element is responsive to changes in the background portion to identify a target portion of the field of view.

8. The target tracking system of claim 7 wherein the target tracking element is a multi-point target tracking element configured to track two or more track points on the target.

9. The target tracking system of claim 7 wherein the target tracker further comprises:
    a target dynamics processing element to process target movement and compute a dynamic error signal for the target;
    a background dynamics processing element to process background movement and compute a dynamic error signal for the background;
    a Kalman filter responsive to the dynamic error signals to generate the tracking control signals; and
    a computed effect level processing element to compute a time, a distance, and an amount of target jitter for a fire control element,
    wherein the fire control element is responsive to outputs of the computed effect level processing element to increase the time with increased amounts of target jitter to achieve a desired effect.

10. The target tracking system of claim 1 wherein the target identifier is configured to identify a human target within the video signals and to identify the one or more track points on the human target.

11. A directed energy system comprising:
    a target tracking system to track one or more track points on a target as the target moves; and
    a beam transmission unit to maintain a directed energy beam on a selected one of the track points in response to tracking control signals provided by the target tracking system, wherein the track points are smaller than a spot size of the directed energy beam maintained on the target to allow the directed energy beam to cover the selected track point to compensate for target jitter and cause a desired effect within the selected track point.

12. The directed energy system of claim 11 wherein the target tracking system comprises:
a target identifier to receive video signals and to separate the target from a background;
a target tracker to track the one or more track points on the target based on outputs of the target identifier and based on a rate-sensor signal from the beam transmission unit; and
a tracking controller to generate the tracking control signals based on outputs of the target tracker to control the beam transmission unit for placement of a directed energy beam on the selected track point.

13. The system of claim 12 wherein the beam transmission unit comprises one or more rate sensors configured to sense a rate-of-motion of the beam transmission unit and provide the rate-sensor signal for use by the target tracker to track the one or more track points on the target as part of a tracking control loop.

14. The system of claim 13 wherein the beam transmission unit comprises a main reflector antenna, a sub reflector, and rate sensors,
wherein the video signals are generated by a video transmission unit coupled to the main reflector antenna and directed to capture video in a transmission direction of the main reflector antenna,
wherein the tracking control signals are further configured to control the transmission direction of the main reflector antenna when tracking the target to keep the target in a field of view of the video transmission unit, and
wherein the tracking controller is configured to generate the tracking control signals to control the sub reflector for placement and focus of the directed energy beam on a selected one of the track points.

15. The system of claim 14 further comprising a fire control element configured to control an amount of time the directed energy beam is positioned on a selected one of the track points,
wherein the amount of time is calculated to provide a surface temperature rise based on a distance to the target and the spot size on the target.

16. The system of claim 15 wherein the system is a hand-held directed energy weapon.

17. The system of claim 13 wherein the beam transmission unit further comprises a millimeter-wave amplifier,
wherein the millimeter-wave amplifier is a solid state amplifier configured to generate a high-power millimeter-wave signal having a frequency between 94 and 96 GHz, and
wherein the main reflector antenna comprises a flat parabolic surface antenna having a geometrically flat surface with an array of elements to allow the main antenna to operate electromagnetically as a parabolic reflector to generate a focused beam on the target.

18. A method for deterring a target comprising:
optically tracking one or more track points on the target as the target moves;
using a rate-of-motion of a beam transmission unit to maintain a directed energy beam on a selected one of the track points with a tracking control loop; and
maintaining the directed energy beam on the selected track points for a period of time to cause a deterring effect by raising surface temperature within the selected track point,
wherein the one or more track points are configured to be smaller than a spot size of the directed energy beam to allow the directed energy beam to cover the selected track point to compensate for target jitter and cause the deterring effect within the selected track point.

19. The method of claim 18 wherein the beam transmission unit is configured to generate the directed energy beam, and
wherein the method further comprises reducing effects of target jitter and target movement using the rate-of-motion and by optically tracking track points selected to be smaller than the spot size of the directed energy beam maintained on the target.

20. A method for operating a directed energy system comprising:
enabling operation of the directed energy system when a calibration and a location are verified; and
disabling operation of the directed energy system when the calibration or the location is not verified, and
wherein the directed energy system is configured to maintain a directed energy beam on a selected track point for a period of time to cause a deterring effect by raising surface temperature within the selected track point,
wherein the selected track point is smaller than a spot size of the directed energy beam to allow the directed energy beam to cover the selected track point to compensate for target jitter and cause the deterring effect within the selected track point.

21. The method of claim 20 further comprising disabling operation of the directed energy system after a target exposure time is exceeded.

22. The method of claim 21 wherein enabling comprises enabling operation of the directed energy system when a user is authenticated, and
wherein disabling comprises disabling operation of the directed energy system when the user is not able to be authenticated.

23. The method of claim 21 further comprising:
verifying operational rules of engagement based on the calibration and the location; and
disabling operation of the directed energy system when the operational rules of engagement are not met.

24. The method of claim 23 wherein the location is verified based on GPS location information, and
wherein the directed energy system comprises a target tracking system to track one or more track points on a target as the target moves, and a beam transmission unit to maintain a directed energy beam on a selected one of the track points in response to tracking control signals provided by the target tracking system, and
wherein the track points are smaller than the spot size of the directed energy beam maintained on the target.

* * * * *

UNITED STATES PATENT AND TRADEMARK OFFICE
CERTIFICATE OF CORRECTION

PATENT NO. : 8,188,905 B2  
APPLICATION NO. : 12/474483  
DATED : May 29, 2012  
INVENTOR(S) : James R. Gallivan It is certified that error appears in the above-identified patent and that said Letters Patent is hereby corrected as shown below:

In the drawings, on sheet 1 of 5, in Figure 1, reference numeral 114, delete "CONTROLLS" and insert --CONTROLS--, therefor In column 3, line 31, delete "deter" and insert --determine--, therefor In column 7, line 23, delete "1.72(b" and insert --1.72(b)--, therefor Signed and Sealed this  
Twelfth Day of March, 2013

Teresa Stanek Rea  
*Acting Director of the United States Patent and Trademark Office*